May 4, 1948. Z. M. ROEHR 2,440,915
PROCESS FOR PRODUCING AEROSOLS
Filed Jan. 3, 1946
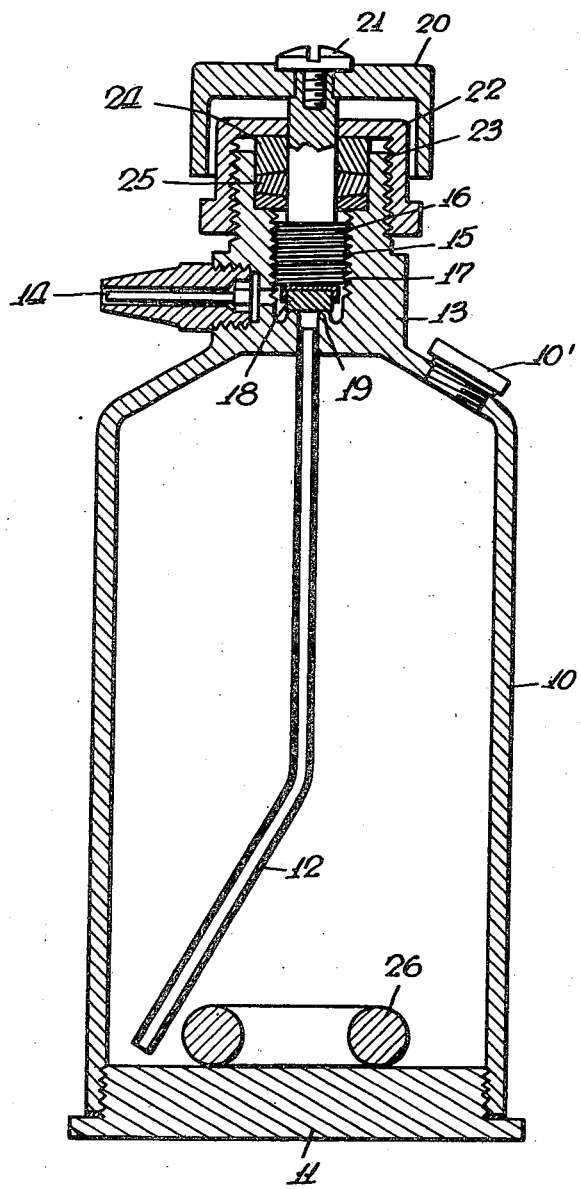
INVENTOR
Zbislaw M. Roehr
BY
ATTORNEYS Patented May 4, 1948

2,440,915

UNITED STATES PATENT OFFICE 2,440,915

PROCESS FOR PRODUCING AEROSOLS

Zbislaw M. Roehr, New York, N. Y., assignor to The Roberts Manufacturing Co., New York, N. Y., a copartnership Application January 3, 1946, Serial No. 638,879

6 Claims. (Cl. 252—305)

This invention relates to the production of aerosols or aerocolloids.

The use of liquefied gases such as "Freon-12" as the solvent or carrier for the material to be dispersed, which solvent or carrier evaporates rapidly when the solution or mixture is sprayed into the atmosphere, is objectionable for domestic insect sprays because of explosion hazards and other dangers involved, since storage and transportation under high pressure is necessary to maintain the liquefied gases in the liquid phase.

Solvents such as acetone or alcohol that are liquid at atmospheric temperature but have a boiling point sufficiently low to evaporate fairly readily and that are dispersed by a gas such as carbon dioxide dissolved therein are also objectionable for domestic insect sprays because they are characterized by one or more of the following objections: inflammability, toxicity, irritancy to the eyes, the nasal and the bronchial tracts, and injuriousness to drapes, wall paper and furniture.

It is among the objects of the present invention to provide a method for producing aerosols in which a solvent or carrier is employed, which solvent or carrier is liquid at or near room temperature and hence can be transported and stored at a pressure which, at most, is but slightly above atmospheric pressure, has a relatively high vapor pressure, is non-inflammable, non-corrosive, non-toxic and non-irritant, is an excellent solvent or carrier for a wide variety of parasiticides and disinfectants, and which method eliminates the necessity for using carbon dioxide or other extraneously derived gas to place the solution under pressure, upon release of which dispersion of the solution in the atmosphere takes place to produce the aerosol.

Another object is to provide an improved apparatus, simple in design and construction, in which the solution may be stored and which apparatus itself is designed to generate when it is desired to form the aerosol, a vapor pressure sufficient to effect the dispersion of the solution in the atmosphere upon release of the pressure, and the production of a stable aerosol, and this is accomplished without resort to the introduction of extraneous ingredients into the solution.

Other objects and advantages of this invention will be apparent from the following description thereof.

According to this invention, the material to be dispersed is dissolved preferably in trichlor monofluor methane, but may be dissolved in methylene chloride or other solvent of high vapor pressure liquid at atmospheric pressure. When it is desired to produce the aerosol, the solution is heated, i. e., the solution is heated to generate such pressure that as the pressure upon the solution is released, the solution vaporizes in the atmosphere with explosive force due to its relatively high vapor pressure, and as a result of such explosive vaporization, the solute is still further subdivided, producing a stable aerosol. For this action, the vapor pressure, generated by heating the solution, desirably is at least 40 pounds per square inch gauge, preferably within the range of 125 to 225 pounds per square inch gauge.

Trichlor monofluor methane has a boiling point of 74.4° F. (at 760 mm. of mercury), and hence can be stored and transported at a pressure slightly above atmospheric. It uniquely presents the desired properties of importance for insecticide or disinfectant sprays for domestic use, not only because of its relatively low boiling point at room temperature, but also because it has a high vapor pressure when heated, so that it evaporates readily, it is non-inflammable, has a slight but agreeable odor, is non-toxic and non-irritant, is an excellent solvent or carrier for various parasiticides, including insecticides and fungicides, and disinfectants that are commonly used, has a high density, namely, about 1.5, and is readily heated to generate a high vapor pressure, so that upon release of this pressure, the solution or mixture vaporizes with explosive force into the atmosphere, releasing the solute in the form of aerosol particles.

Among the materials which are soluble in, and may be dispersed in the form of an aerosol employing as the solvent, trichlor monofluor methane, in accordance with this invention, are DDT (dichloro diphenyl trichlorethane), pyrethrins, rotenone, sesame oil and other insecticides, fungicides, disinfectants and fumigants soluble in trichlor monofluor methane. This invention is particularly effective for producing aerosols of DDT and pyrethrins mixtures; pyrethrins give rapid but not lasting control when used, for example, to control flies or mosquitoes, whereas DDT gives initially slow but lasting control when used to combat flies and mosquitoes. By dissolving a mixture of pyrethrins and DDT in trichlor monofluor methane, the resulting aerosol gives both rapid and lasting control.

Examples of disinfectants which may be employed are triethylene glycol and propylene glycol. These disinfectants, while not soluble in trichlor monofluor methane, are soluble for example, in a mixture of trichlor monofluor methane and methylene chloride, or a mixture of trichlor monofluor methane and acetone; for example, the constituents may be mixed in the proportions of 10 parts by weight of triethylene glycol to 65 parts of the trichlor monofluor methane, and 25 parts of methylene chloride.

The amount of material to be dispersed, dissolved in trichlor monofluor methane, will depend on the intended use for the aerosols, the conditions under which it is used, e. g., the size of the room, chamber, cabin or other space to be treated for the purposes of killing insect pests, fumigating or disinfecting the same, the temperature and pressure conditions prevailing therein, and the degree of infestation in the case where the aerosol is used to control insect pests, etc. From approximately 5 to 25 parts by weight of material to be dispersed per 100 parts of solvent or carrier will usually be found satisfactory.

The solution of material to be dispersed in the trichlor monofluor methane may be stored and shipped as an article of commerce, or alternatively the individual constituents may be stored and shipped separately and combined when it is desired to produce the aerosol. Since the parasiticidal materials, disinfectant or other materials to be dispersed in general have little or no appreciable vapor pressure, the resultant solution thereof in trichlor monofluor methane has a vapor pressure which is equal to or slightly below that of the trichlor monofluor methane, and hence the solution can be stored and transported in a similar manner to aqueous solutions.

In the accompanying drawing forming a part of this specification, the single figure shows for the purposes of exemplification, a vertical section through a preferred form of apparatus for practicing the process of this invention; it will be understood the invention is not limited to this illustrative instance.

In the drawing, 10 is a container desirably of steel or other metal capable of withstanding relatively high pressure of the order of 125 to 225 pounds gauge. This container may be provided with a base 11 in threaded engagement with the walls to form a gas-tight closure, or, if desired, the base may be formed integral with the sides. A discharge tube 12 extends from a point just above the base into the head 13 which is provided with a discharge orifice 14 and a valve 15 controlling the flow through this discharge orifice. Desirably, valve 15 comprises a valve stem 16 in threaded engagement with a cylindrical bore 17 in the head 13 and has fastened to the end of stem 16 a disc 18 of hard rubber or other suitable material adapted to engage seat 19 of the valve to form a gas-tight closure for the discharge end of tube 12. Valve stem 16 may be manipulated by means of a handle 20 secured thereto by screw 21 or otherwise suitably secured to the top of stem 16.

A packing gland 22 of conventional construction and consisting, for example, of a collar 23 in threaded engagement with the head 13, and having a portion 24 for engaging and exerting pressure on packing 25 may be employed to provide a gas-tight seal for the upper portion of the valve stem.

Container 10 is provided with a heating unit 26, desirably in the form of an electrically operated resistance coil or other unit operable from any convenient source of electric power.

The solution of material to be dispersed in trichlor monofluor methane is charged into container 10 through a suitable opening 10' in the container provided for this purpose, which opening, after the solution has been introduced into the container, is closed. The solution remains in the container at the vapor pressure generated by trichlor monofluor methane, which is slightly above atmospheric. This provides an additional factor of safety since a sprayer under relatively high pressure is always a source of potential danger, especially in households. When it is desired to produce the aerosol, the heating unit is operated to heat the solution to a point such that the vapor pressure within the container 10 is at least 40 pounds per square inch gauge and preferably within the range of 125 to 225 pounds per square inch gauge. Instead of heating the solution by an internal unit, the container may be heated externally, for example, by placing it in a hot water bath or on a range, such as a gas or electrically heated household range. Since valve 15 is closed, the solution remains under this pressure in container 10. Upon opening of valve 15, the solution flows through the discharge pipe 12 into and through orifice 14, being atomized due to the pressure on the solution and vaporizing into the atmosphere with explosive force, as a consequence of which the solute is still further subdivided, producing a stable aerosol.

Whenever the vapor pressure drops in container 10, to a point such that the solution is not atomized satisfactorily, the contents may be reheated. Upon complete or partial exhaustion of the solution from container 10, it may be refilled, the solvent being supplied from a bottle or can containing it, under pressure at most but slightly above atmospheric.

The process and apparatus of this invention is particularly applicable to the production of aerosols of DDT and pyrethrins to effect control of flies, mosquitoes and other insect pests.

It will be noted this invention results in the production of aerosols employing a solvent which is liquid at or near room temperature, and hence can be stored and transported under little pressure, presenting none of the dangers attendant upon the storage and transportation of liquefied gases. Further, the solvent trichlor monofluor methane possesses, to an unusual extent, desirable properties rendering it particularly efficacious for the production of aerosols or aerocolloids. Furthermore, to produce the aerosol, it is only necessary to heat the material to be dispersed in the solvent to generate sufficient vapor pressure to effect the explosive vaporization of the solution into the atmosphere upon release of the pressure. Moreover, this invention provides an apparatus for effecting such heating of the solution and the production of the desired aerosol, which apparatus is simple and efficient in design, construction and operation.

The term "solution" is used in the specification and claims in a broad sense, and is intended to include not only true solutions, but also colloidal solutions and dispersions or mixtures of the material to be dispersed in or with trichlor monofluor methane, methylene chloride, or other solvent of high vapor pressure liquid at atmospheric pressure and with or without added materials.

As many changes could be made in the above process and apparatus and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent of the United States is:

1. The method of producing an aerosol, which comprises producing a solution of the material to be dispersed in trichlor monofluor methane, storing said solution an an airtight container at approximately atmospheric pressure heating said solution under confinement, thereby to place it under superatmospheric pressure, and releasing the pressure, explosively to vaporize the solution into the atmosphere.

2. The method of producing an aerosol, which comprises producing a solution of the material to be dispersed in trichlor monofluor methane, storing said solution in an airtight container at approximately atmospheric pressure heating said solution until the vapor pressure generated is at least 40 pounds per square inch gauge, and releasing the pressure, explosively to vaporize the solution into the atmosphere, with release of the solute in aerosol form.

3. The method of producing an aerosol, which comprises producing a solution of the material to be dispersed in trichlor monofluor methane, storing said solution in an airtight container at approximately atmospheric pressure heating said solution until the vapor pressure generated is within the range of 125 to 225 pounds per square inch gauge, and releasing the pressure, explosively to vaporize the solution into the atmosphere.

4. The method of producing an aerosol, which comprises storing a solution of the material to be dispersed in trichlor monofluor methane under a pressure not greatly exceeding the vapor pressure of trichlor monofluor methane at room temperature, and when it is desired to produce said aerosol, heating said solution under confinement to place it under superatmospheric pressure such that when the pressure is released, the solution vaporizes explosively into the atmosphere.

5. The method of producing an aerosol, which comprises storing a solution of the material to be dispersed in trichlor monofluor methane under a pressure not greatly exceeding the vapor pressure of trichlor monofluor methane at room temperature, and when it is desired to produce said aerosol, heating said solution under confinement to place it under a pressure of at least 40 pounds per square inch gauge, so that when the pressure is released, the solution vaporizes explosively into the atmosphere.

6. The method of producing an aerosol, which comprises storing a solution of the material to be dispersed in trichlor monofluor methane under a pressure not greatly exceeding the vapor pressure of trichlor monofluor methane at room temperature, and when it is desired to produce said aerosol, heating said solution to generate a pressure of 125 to 225 pounds per square inch gauge, and releasing said pressure, explosively to vaporize the solution into the atmosphere.

ZBISLAW M. ROEHR.

REFERENCES CITED

The following references are of record in the file of this patent:

UNITED STATES PATENTS

| Number | Name | Date |
|---|---|---|
| 656,061 | Trillat | Aug. 14, 1900 |
| 1,819,184 | Macintire | Aug. 18, 1931 |
| 2,041,219 | Wade | May 19, 1936 |
| 2,070,167 | Jddings | Feb. 9, 1937 |
| 2,321,023 | Goodhue et al. | June 8, 1943 |
| 2,358,986 | Govran et al. | Sept. 6, 1944 |
| 2,413,408 | Fernelius et al. | Dec. 31, 1946 |
| 2,416,256 | Hochberg | Feb. 18, 1947 |